United States Patent
Loebl

(10) Patent No.: US 11,574,200 B2
(45) Date of Patent: Feb. 7, 2023

(54) SYSTEM AND METHOD OF DETERMINING A REGION OF INTEREST IN MEDIA

(71) Applicant: W.s.c. Sports Technologies Ltd., Bene Beraq (IL)

(72) Inventor: Ido Loebl, Ramat Gan (IL)

(73) Assignee: W.s.c. Sports Technologies Ltd., Givatayim (IL)

( * ) Notice: Subject to any disclaimer, the term of this patent is extended or adjusted under 35 U.S.C. 154(b) by 532 days.

(21) Appl. No.: 16/718,559

(22) Filed: Dec. 18, 2019

(65) Prior Publication Data
US 2021/0192355 A1 Jun. 24, 2021

(51) Int. Cl.
*G06N 3/08* (2006.01)
*G06N 3/04* (2006.01)
*G06F 16/435* (2019.01)

(52) U.S. Cl.
CPC .......... *G06N 3/088* (2013.01); *G06F 16/435* (2019.01); *G06N 3/0445* (2013.01); *G06N 3/0454* (2013.01)

(58) Field of Classification Search
CPC .... G06N 3/088; G06N 3/0454; G06N 3/0445; G06N 3/084; G06F 16/435
See application file for complete search history.

(56) References Cited

U.S. PATENT DOCUMENTS

| | | | |
|---|---|---|---|
| 2014/0185863 A1* | 7/2014 | Makkonen | G06V 30/424 382/101 |
| 2015/0082349 A1 | 3/2015 | Ishtiaq et al. | |
| 2015/0161750 A1* | 6/2015 | Bugir | G06Q 10/00 705/310 |
| 2018/0024643 A1* | 1/2018 | Katz | G06F 3/0304 345/156 |
| 2018/0247405 A1* | 8/2018 | Kisilev | A61B 5/7485 |
| 2019/0005657 A1 | 1/2019 | Gao et al. | |
| 2019/0034734 A1* | 1/2019 | Yen | G06N 3/0454 |
| 2019/0138835 A1* | 5/2019 | Xiong | G06N 5/046 |
| 2019/0139642 A1* | 5/2019 | Roberge | G06F 3/013 |
| 2019/0197332 A1* | 6/2019 | Kavanau | G06T 5/002 |
| 2019/0385005 A1 | 12/2019 | Yang | |
| 2020/0082573 A1* | 3/2020 | Zhang | H04N 19/00 |
| 2020/0193164 A1* | 6/2020 | Katti | G06V 10/82 |
| 2020/0302149 A1* | 9/2020 | Gottemukkula | G06V 10/82 |
| 2021/0012502 A1* | 1/2021 | Mulford | G06T 3/0056 |
| 2021/0065364 A1* | 3/2021 | Biswas | G06T 7/0012 |

OTHER PUBLICATIONS

International Search Report for PCT appl. No. PCT/IL2020/051296 dated Feb. 1, 2021.

* cited by examiner

*Primary Examiner* — Etienne P Leroux
(74) *Attorney, Agent, or Firm* — Pearl Cohen Zedek Latzer Baratz LLP

(57) ABSTRACT

Systems and methods of generating a new media data element from a source media data element, including: receiving the source media data element including one or more frames; applying a machine learning algorithm to predict at least one first Region of Interest (ROI) in one or more of the at least one frames; and cropping, the one or more frames to generate a new media data element based on the predicted at least one first ROI.

15 Claims, 7 Drawing Sheets

SYSTEM AND METHOD OF DETERMINING A REGION OF INTEREST IN MEDIA

FIELD OF THE INVENTION

The present invention relates to media systems. More particularly, the present invention relates to systems and methods for determining a region of interest (ROI) in media.

BACKGROUND OF THE INVENTION

Mobile computerized devices that allow media streaming became very common so that anybody with internet access via a mobile device (e.g., via a smartphone) gets easy access to entertainment all the time. However, entertainment providers, such as television broadcasters, typically have not caught up with the technological advancements in mobile devices and continue to broadcast media suitable only for viewing on large screens. For example, a viewer watching a movie or a sports game on a TV screen can get a very different experience compared to a viewer watching a movie or a sports game on a smaller screen of a mobile device.

Some entertainment providers created new dedicated platforms for watching media on mobile devices where the display resolution can be adapted for smaller screens. However, with increased use of social media in recent years, the majority of users (or media consumers) are experiencing entertainment in new ways, such as with scrolling an "Instagram story" page to view videos uploaded by other users where each video can be at different resolution, aspect ratio, etc. It would therefore be desirable to have a possibility of consuming media on mobile devices that is adaptable to the way users view content on various platforms on mobile devices.

SUMMARY OF THE INVENTION

There is thus provided, in accordance with some embodiments of the invention, a method of generating a new media data element from a source media data element, including: receiving, by a processor, the source media data element including one or more frames; applying, by the processor, a machine learning algorithm to predict at least one first Region of Interest (ROI) in one or more of the at least one frames; and cropping, the one or more frames to generate a new media data element based on the predicted at least one first ROI.

In some embodiments, the machine learning algorithm may be trained, wherein the training may include: receiving, by the processor, a plurality of media data elements, tagging at least one second ROI for each media data element of the plurality of media data elements; and feeding the received media data elements and each of the at least one second ROI to the machine learning algorithm to train the machine learning algorithm to predict the at least one ROI in another media data element.

In some embodiments, the machine learning algorithm may include at least one of: a Convolutional Neural Network (CNN) and a Recurrent Neural Network (RNN). In some embodiments, the tagging may be carried out in at least one of two perpendicular axes.

In some embodiments, an encoder may be applied to perform a transformation to at least one frame in the source media data element to produce at least one feature vector, wherein the machine learning algorithm may be configured to predict the at least one first ROI based on the produced at least one feature vector. In some embodiments, the training the encoder may be unsupervised. In some embodiments, the training the encoder may be supervised.

In some embodiments, the machine learning algorithm may be trained to minimize a regression loss function on the plurality of media data elements by at least one of: mean squared error, L1 mean absolute error, log-cosh error and Huber loss error between the predicted coordinates of the ROI and the tagged coordinates of the ROI. In some embodiments, the predicted at least one first ROI may be modified, wherein at least one frame of the new media data element may include the modified at least one first ROI. In some embodiments, the predicted at least one first ROI may be modified, wherein at least one frame of the new media data element may be cropped based on the modified at least one first ROI.

In some embodiments, at least one frame of the new media data element may include the predicted at least one ROI. In some embodiments, the training may be based on at least one of: transfer learning and parameters fine tuning. In some embodiments, a new display aspect ratio may be selected for the generated new media data element, wherein the selected new display aspect ratio may be different than a display aspect ratio of the received source media data element. In some embodiments, the machine learning algorithm may be a recurrent neural network (RNN), wherein the source media data element may include at least one sequence of frames, and wherein the applying of the encoder may include: selecting, by the processor, 'N' frames from the at least one frame sequence; and feeding each of the 'N' frames to the encoder to receive a sequence of 'N' feature vectors. In some embodiments, at least one layer of the RNN may include one of: 'N' bidirectional long short-term memory (LSTM) units and 'N' unidirectional LSTM units.

There is thus provided, in accordance with some embodiments of the invention, a method of predicting a region of interest (ROI) in media data elements, including: receiving, by a processor, a source media data element; applying, by the processor, a machine learning algorithm to detect at least one object in the received source media data element; predicting, by the processor, a ROI in the received source media data element, wherein the ROI is predicted based on the detected at least one object; and cropping, by the processor, the received source media data element to generate a new media data element based on the predicted ROI, wherein the generated new media data element is a portion of the source media data element.

There is thus provided, in accordance with some embodiments of the invention, a method of predicting a region of interest (ROI) in media, including: training, by a processor, a machine learning algorithm to predict the ROI in media data elements, wherein the training includes: receiving, by the processor, a plurality of second media data elements; tagging at least one second ROI for each of the received plurality of second media data elements; and feeding the at least one second ROI to the machine learning algorithm to train the machine learning algorithm to predict the at least one first ROI in at least one frame of the at least one first media data element; receiving, by a processor, a source media data element; and applying, by the processor, the trained machine learning algorithm to predict a first ROI in the received source media data element.

In some embodiments, the received source media data element may be cropped to generate a new media data element based on the predicted first ROI, wherein the generated new media data element may be a subset of the source media data element. In some embodiments, the machine learning algorithm may be trained to minimize a regression loss function on the plurality of second media data elements by at least one of: mean squared error, L1 mean absolute error, log-cosh error and Huber loss error between the predicted coordinates of the first ROI and the tagged coordinates of the second ROI.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
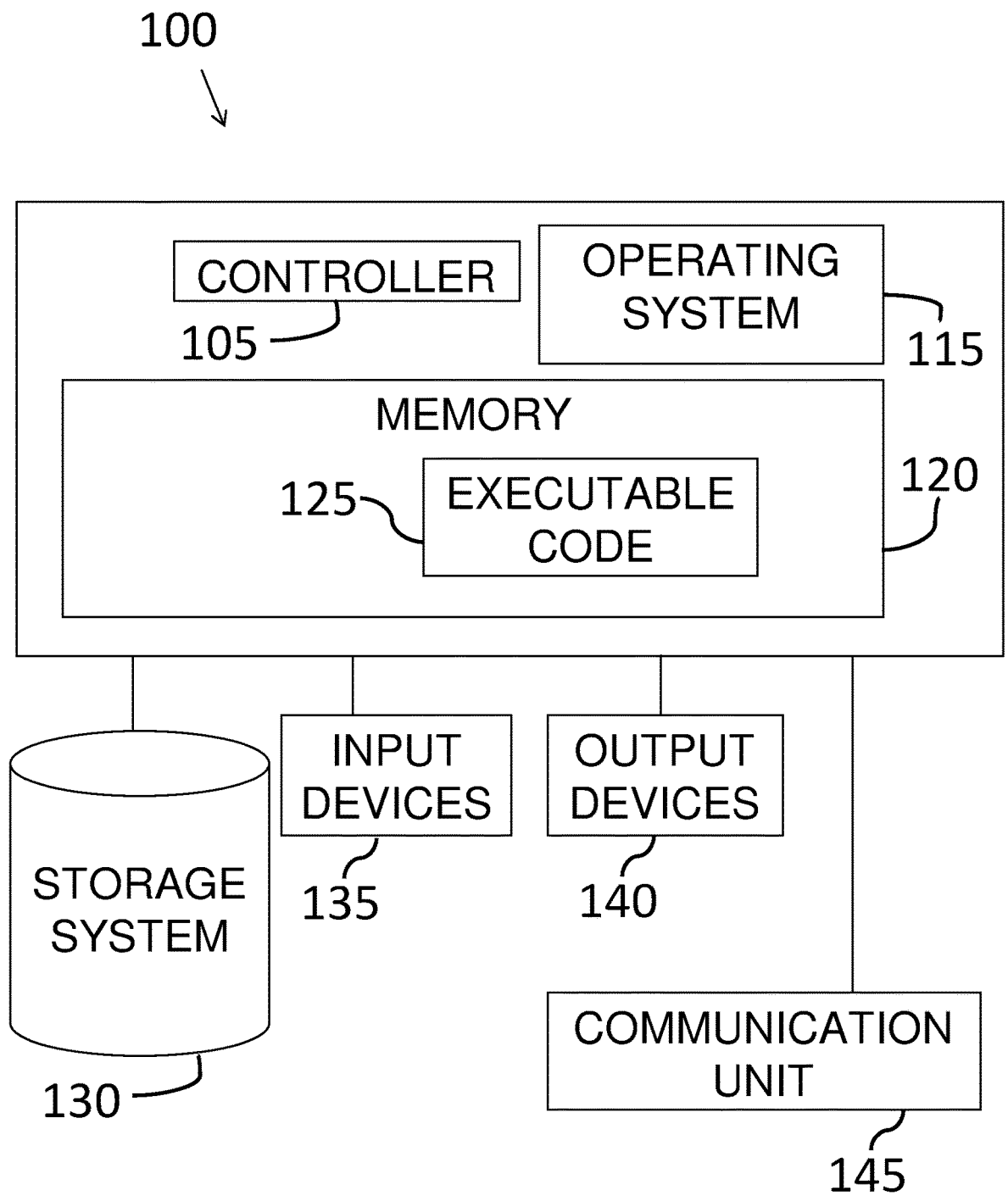
FIG. 1 shows a block diagram of an examplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device 100, for example, to act as the various devices or the components shown in FIG. 2A. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
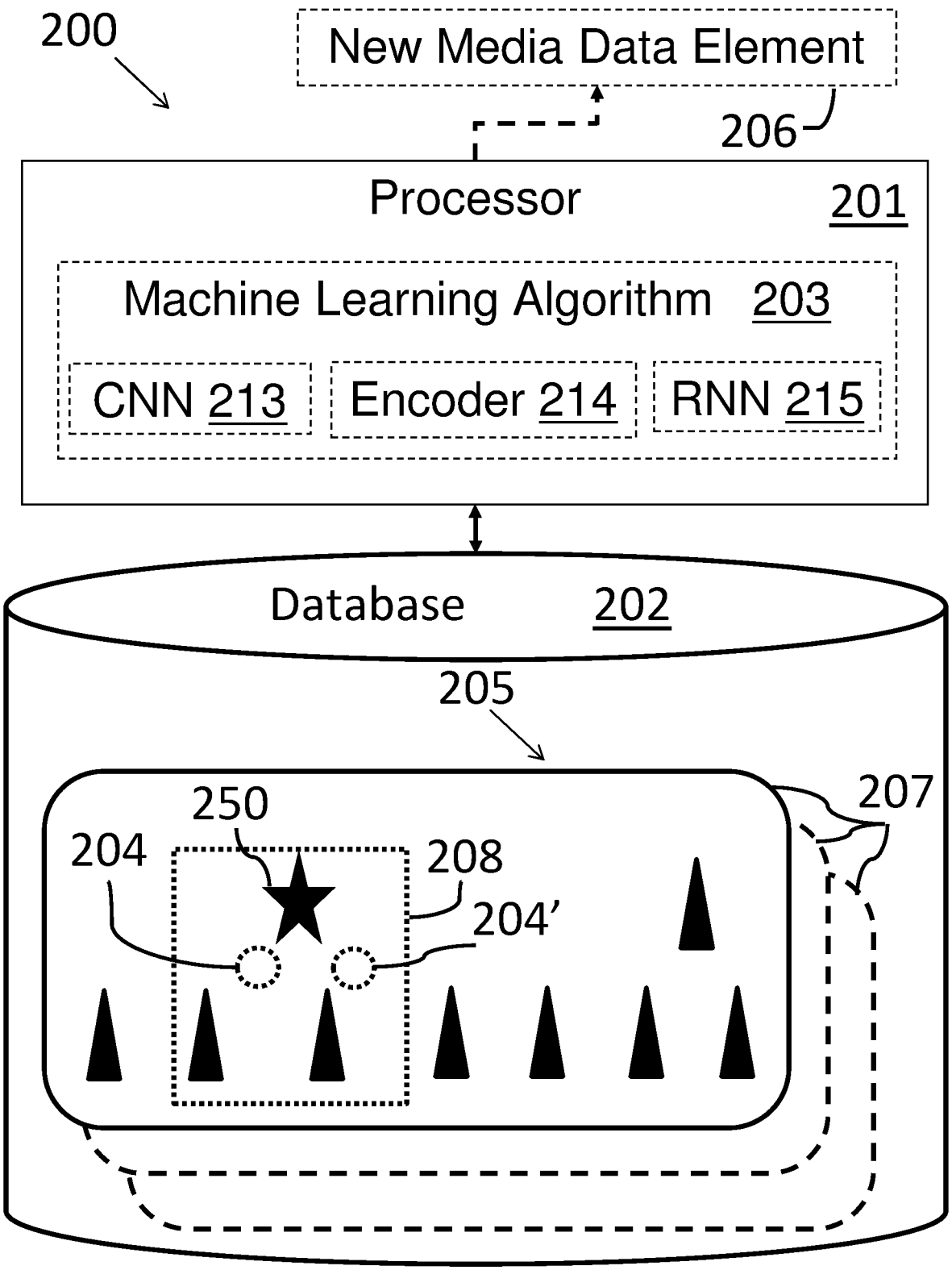
FIG. 2A shows a block diagram of a region of interest (ROI) determination system, according to some embodiments of the invention.

Reference is now made to FIG. 2A, which shows a block diagram of a region of interest (ROI) prediction system 200, according to some embodiments. In FIG. 2A, hardware elements are indicated with a solid line and the direction of arrows may indicate the direction of information flow.

The ROI prediction system 200 may include a processor 201 (e.g., such as controller 105, shown in FIG. 1) configured to train a machine learning algorithm 203 (e.g., with supervised or unsupervised machine learning) to determine or predict at least one first ROI 204 in source media data elements 205. For instance, the ROI 204 may be represented by at least one coordinate. The at least one first ROI 204 may be a set of coordinates corresponding to a sequence of still images such that each ROI 204 coordinate may correspond to a still image (or frame). According to some embodiments, the ROI 204 may represent an area (of interest) in an image, or the ROI 204 may represent a coordinate of the area such that the predicted at least one first ROI 204 may include an area or a coordinate. In some embodiments, a single coordinate of the at least one first ROI 204 may represent an area (e.g., in an image). Hereinafter, the ROI 204 may be referred to either an area or a coordinate.

The machine learning algorithm 203 may accordingly crop a portion of the source media 205 based on the predicted at least one first ROI 204 (e.g., crop a new frame of a video file) to generate a new media data element 206. In some embodiments, the new media data element 206 may include the at least one first ROI 204. For example, the new media data element 206 may include the at least one first ROI 204 as a subset (e.g., of frames) of the source media data element 205, for instance the new media data element 206 may include a portion of the source media data element 205 with the portion based on the at least one first ROI 204. In some embodiments, the new media data element 206 may include at least one frame of a video with the at least one first ROI 204 at the center of the at least one frame. In some embodiments, a new display aspect ratio may be selected for the generated new media data element 206, where the selected new display aspect ratio (e.g., of the subset) may be different than the display aspect ratio of the received source media data element.

In some embodiments, the training carried out by processor 201 may include receiving a plurality of source media files 205 with media data elements, for example receiving a video file (e.g., a video of a sport event) from a database 202 in communication with the processor 201. In some embodiments, each source media data element 205 may include at least one frame 207 (e.g., a still image of a video file or a sequence of still images) and the at least one first ROI 204 may be predicted for each frame 207 of the source media data element 205. The processor 201 may apply the machine learning algorithm 203 to predict at least one first ROI 204 in one or more of the at least one frames 207.

For supervised training, a plurality of human taggers may watch the source media content 205 with real events (e.g., basketball games), for instance from the database 202. While watching the source media content 205, the human taggers may continuously tag an area or a coordinate of at least one second ROI 204' in at least one frame 207 of the media content 205. In some embodiments, the coordinate of the second ROI may be tagged in at least one of two perpendicular directions or axes, for instance using a dedicated tagging module to tag the at least one second ROI 204' for viewing in the horizontal and/or vertical directions, for instance in a running video the tagging module may generate a horizontal/vertical rectangle that may move across the screen to be tagged by the human tagger. During supervised training, each time the coordinate is tagged, a data tuple or vector may be generated for at least one of media and/or coordinate and/or related data such as particular position of the ROI within a frame 207 of the media content 205 (e.g., in a video segment).

In some embodiments, the processor 201 may apply a noise reduction function on the tagged media before training, for instance during pre-processing. The noise reduction function may remove noise in tags caused by human error, for example when a single frame's tagging is different or remote to tags in adjacent frames (e.g., due to wrong tagging caused by human error).

Once training is complete and a new source media data element is received by processor 201, the trained machine learning algorithm 203 may be applied to predict at least one first ROI 204 in the received new source media data element. In some embodiments, the predicted ROI may be corrected and/or modified in at least one frame 207 in order to remove noise, for instance by automatically averaging the ROI position across adjacent and/or consequent frames. In some embodiments, a post-processing method, for instance once the ROI prediction is completed, may be applied with median filter and/or a weighted average and/or automatic averaging and/or a morphological operation such as erosion, dilation, etc.

According to some embodiments, the processor 201 may receive a plurality of source media data elements 205 (e.g., from the database 202) and tag at least one second ROI 204' for at least one frame 207 of at least one source media data element 205. For instance, the processor may implement an object detection algorithm to detect an object of interest to be used as the at least one ROI 204. In another example, the at least one second ROI 204' may be tagged by a human tagger.

The at least one frame 207 and the tagged at least one second ROI 204' may be fed for training the machine learning algorithm 203. The purpose of the training of the machine learning algorithm 203 is to predict the at least one first ROI 204 given the corresponding at least one frame 207, in another media data element.

The machine learning algorithm 203 may include an encoder module 214 to perform a transformation to at least one frame in the source media data element 205 to produce at least one feature vector. For instance, an autoencoder architecture may be used for the machine learning algorithm 203, where the autoencoder includes two parts, as an encoder followed by decoder, and is trained in an unsupervised manner to minimize a regression loss function on the trained samples of at least one of: the mean squared error, L1 mean absolute error, log-cosh error and Huber loss error between the input of the encoder 214 and the output of the decoder. In some embodiments, the decoder may be removed at some point after the training. In some embodiments, the encoder 214 may be applied in order to perform a dimensionality reduction on at least on frame 207 of the source media data element 205.

In some embodiments, the encoder 214 may include a convolutional neural network (CNN) 213 architecture, and in some embodiments the CNN 213 architecture may serve as the machine learning algorithm 203 to predict the at least one first ROI 204. For example, the CNN 213 may be trained in a supervised manner (e.g., with human or automatic tagging (self-supervised training)) to predict the at least one first ROI 204 in new media elements, for a given at least one frame 207 by minimizing a loss function between the predicted at least one first ROI 204 and the tagged second ROI. For example, the loss function may include mean squared error, L1 mean absolute error, log-cosh error and Huber loss error. In some embodiments, at least one layer of the encoder 214 or CNN 213 may be used as the feature vector.

In some embodiments, the machine learning algorithm 203 may include a Recurrent Neural Network (RNN) 215 architecture. The RNN 215 may receive a sequence of feature vectors corresponding to a sequence of at least one frame 207 and accordingly predict at least one first ROI 204 in new data elements. For example, the RNN 215 may include at least one layer of Long-Short-Term-Memory (LSTM) cells. In some embodiments, the LSTM may be bidirectional. The RNN 215 may be trained by feeding a sequence of feature vectors to the RNN 215 and minimizing the loss function between the predicted at least one first ROI 204 and the tagged second ROI. For example, the loss function may include mean squared error, L1 mean absolute error, log-cosh error and Huber loss error.

According to some embodiments, the machine learning algorithm 203 may include a regression architecture that receives at least one feature vector and predicts at least one first ROI 204 in a new media element. For example, the regression architecture may include linear regression. The regression architecture may be trained by feeding a sequence of feature vectors to the regression architecture and minimizing the loss function between the predicted at least one first ROI 204 and the tagged second ROI. For example, the loss function may include mean squared error, L1 mean absolute error, log-cosh error and Huber loss error.

In some embodiments, the machine learning algorithm 203 may include a Convolutional Recurrent Neural Network (CRNN). The machine learning algorithm 203 may accordingly be trained by receiving a sequence of at least one frame 207 and predict at least one first ROI 204 in new data elements. In some embodiments, the CRNN may be trained by feeding a sequence of at least one frame 207 to the CRNN and minimizing the loss function between the predicted at least one first ROI 204 and the tagged second ROI. For example, the loss function may include mean squared error, L1 mean absolute error, log-cosh error and Huber loss error.

For example, the machine learning algorithm 203 may include a CNN configured with 'VGG16' architecture. In another example, the output of the CNN 213 may be used for input to train the machine learning algorithm 203 with the input including one layer before the final layer (e.g., the layer that produces the prediction). In some embodiments, some weights of layers of the CNN 213 may be loaded from pre-trained network (e.g., on 'ImageNet') while other weights (e.g., of fully connected layers) may be initialized randomly and for instanced later learned by training. For example, processor 201 may randomly determine at least one weight of the CNN 213.

In some embodiments, the CNN 213 may include a three-dimensional CNN (with three-dimensional convolution kernels) accepting as input a sequence media data elements (e.g., a video or images or frames of a video) and the 3D-CNN may serve as the encoder and/or as the predictor. For example, the 3D-CNN may receive 'N' media data elements (e.g., adjacent frames from a video file) as input and trained to predict the at least one first ROI 204 media data elements.

For example, at least one layer of the RNN 215 may include 'N' bidirectional long short-term memory (LSTM) units and/or the RNN 215 may include 'N' unidirectional LSTM units, for instance followed by a fully connected layer. In some embodiments, once the machine learning algorithm 203 predicts the at least one first ROI 204, a new media data element 206 may be generated based on the predicted at least one first ROI 204 in each frame of the new media data element 206. For example, the generated new media data element 206 may include the at least one first ROI 204.

In some embodiments, training of the machine learning algorithm 203 may be based on at least one of: transfer learning (where a model developed for a first task may be reused as the starting point for a model on a second task) and parameter fine tuning (where at least one parameter is chosen to control and/or enhance the learning process).

Figure 2B:
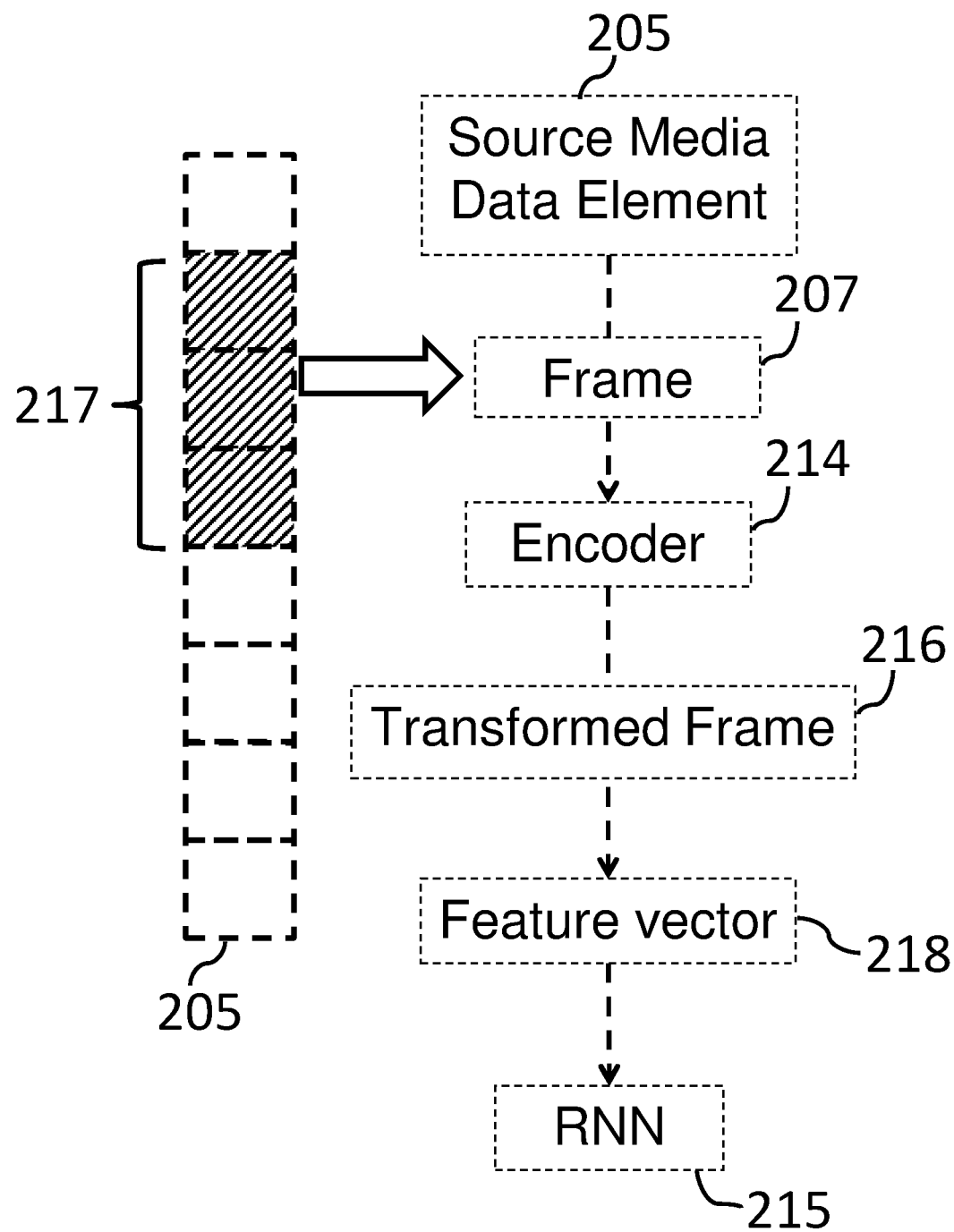
FIG. 2B shows a flowchart for a machine learning algorithm using an encoder architecture, according to some embodiments of the invention.

Reference is now made to FIG. 2B, which shows a flowchart for a machine learning algorithm using an encoder architecture, according to some embodiments. In FIG. 2B, the direction of arrows may indicate the direction of information flow and at least some elements may be similar to the same elements in FIG. 2A (e.g., the RNN 215).

In some embodiments, at least one feature vector 218 may be created from the transformed at least one frame 216. The machine learning algorithm 203 may predict the at least one first ROI based on the created at least one feature vector 218.

In some embodiments, the source media data element 205 may include at least one frame sequence 217 (with a plurality of subsequent frames 207) such that the encoder 214 may be applied to perform the transformation to at least one frame sequence 217 of the source media data element 205. In some embodiments, the processor 201 may select 'N' frames from at least one frame sequence 217 and feed each of the 'N' frames to the encoder 214 to receive a sequence of 'N' feature vectors 218 or one feature vector 218. The machine learning algorithm 203 may include the RNN 215 receiving as input the result (e.g., at least one feature vector 218) from the encoder 214.

The encoder may apply at least one transformation on the input data (e.g., a single media element) to be transferred from the two-dimensional image space and/or the three-dimensional video space to any other transferable representation space. In some embodiments, the CNN 213, for instance two-dimensional and/or three-dimensional, may serve as an encoder architecture when the CNN 213 used as a feature extractor. For example, the encoder 214 may be fed with a single media element (e.g., an image) as input to be transformed by the encoder 214 until a feature vector may be extracted as input for the RNN 215

For example, the machine learning algorithm 203 including the encoder 214 may be trained with a network including an encoder and a decoder, the encoder with input layer in space X is fed with an input of a media element x, transforms to h in space H, and the corresponding decoder transforms h to x' in space X, thereby creating a structure of an autoencoder (e.g., such as a neural network from X to X', with embedded at least one hidden layer H). The input images x may be fed to the network, and the mean squared errors (MSE) between the output x' and the input x may be measured. Other error functions may also be possible, for example mean absolute errors, and the like. A back propagation may be carried out to minimize the MSE, and thus repeated until there is no longer any improvement in the MSE value. Finally, the decoder may be removed, and the encoder may accordingly serve as an encoder for other tasks (e.g., with transfer learning).

Reference is now made back to FIG. 2A. The RNN 215 may be trained to predict the coordinate of the first ROI 204 by inputting 'N' media elements (e.g., 'N' image of adjacent frames of a media file) and feeding each media element in the trained CNN 213 or encoder 214 where the output, for example some layer or the last layer before the final layer, of the CNN 213 may be used as a feature vector 218. In some embodiments, the 'N' media elements may accordingly yield 'N' feature vectors (or sequences) to be fed as input to the RNN 215, with at least one feature vector 218 for each one of 'N' LSTM units.

In some embodiments, the machine learning algorithm 203 may be trained by minimizing a regression loss function on the trained samples of at least one of: mean squared error, L1 mean absolute error, log-cosh error and Huber loss error between the predicted coordinates of the first ROI 204 and the tagged coordinates of the second ROI 204. For example, processor 201 may apply a correction algorithm with the machine learning algorithm 203 in order to minimize the sum of errors.

In some embodiments, the RNN 215 may be trained with at least one layer of attention (e.g., at the input or output to the LSTM units) configured to amplify at least one feature in at least one feature vector. In some embodiments, the at least one layer of attention may receive feature vectors and accordingly output feature vectors which are a combination (e.g., a linear combination) of the input feature vectors. Before the layer of attention mechanism, a layer in the RNN 215 may look at the complete input sequence and compress all information into a fixed-length vector, and the layer of attention may allow a layer in the RNN 215 to look over all the information that the previous layer or the original input holds with amplification of specific (predefined) features in specific vectors and/or creating a combination of the input feature vectors. The RNN 215 may include at least one dense layer, and the output of the dense layer may be fed as the layer of attention (e.g., using a 'softmax' function).

In some embodiments, the first ROI 204 may be predicted by inputting 'N' media elements (e.g., an image as in a frame of a media file) to the CNN 213 and accordingly receiving 'N' feature vectors from the CNN 213. The received 'N' feature vectors may be inputted as input to the RNN 215 to receive the RNN 215 output as predictions of the first ROI for these 'N' media elements.

According to some embodiments, the prediction of first ROI 204 for newly received source media data elements may be carried out in the CNN 213 architecture and/or the combination architecture of CNN 213 with RNN 215 and/or an encoder 214 architecture with RNN 215. For the CNN 213 architecture, media elements 205 (e.g., frames of a video) may be received, for example with a subsample. The received media elements 205 (e.g., frames) may pass as input through the CNN 213 with the outputs of the final layer used as the prediction of the first ROI coordinates 204. For the combination architecture of CNN 213 with RNN 215, the received media elements 205 (e.g., frames) may pass as input through the CNN 213 with the outputs of any layer before the final layer used as a feature vectors for the RNN 215 for the prediction of the first ROI coordinates 204, for instance using one feature vector for each one of 'N' LSTM units. Each received media data element 205 may be divided (e.g., by processor 201) into 'N' consecutive media elements or frames, for example carried out with a stride smaller than 'N' such that some frames may appear in two adjacent sequences. The 'N' outputs of the RNN 215 may be used as the prediction of the first ROI coordinates 204 after multiple predictions for the same frame may be pooled to one value.

According to some embodiments, users of computerized mobile devices (e.g., smartphones, tablets, etc.), for example that use social media platforms, are experiencing media consumption in a new way that is adapted to the way the mobile device is held by the user, for instance watching videos in a vertical display in smartphones. Since the original media content is provided for old fashioned viewing methods, designed for horizontal viewing as in TVs, the users that watch media vertically get a worst experience as it is not suitable for the way the consume media. In order to correct this problem and provide a way to consume media adapted to new technology of media streaming in mobile devices, the processor 201 may crop and/or modify the predicted first ROI 204, e.g., as a portion from an image 208, to be in a different aspect ratio and/or be cropped to a sub-image while maintaining the same aspect ratio. For example, processor 201 may crop a vertical ROI from a horizontal video input.

Since tagging of the second ROI coordinate 204' is subjective, the selection of the suitable algorithm may also be subjective. In order to determine which of the varied training and optimization outcomes may be optimal, a performance measure may be applied. Initially, a group of media elements (e.g., videos) may be randomly chosen and tagged by 'M' different taggers. The 'M' tags correspond to 'M' ROI center coordinates vector for each frame 207 in the media element 205. From each vector an acceptable interval (I) may be pooled with [min(vector), max(vector)] such that the videos may pass through the algorithm with summation of the following error function:

$$\text{Error} = \Sigma_i \left(1 - \Pi \left(\frac{y_i - \frac{\min(I_i) - \max(I_i)}{2}}{\max(I_i) + \min(I_i)}\right)\right) \times \min((y_i - \min(I_i))^2, (y_i - \max(I_i))^2)$$

where, $\pi(x)=1$ if $|x| \leq \frac{1}{2}$, and 0 otherwise. Also, 'i' may be the frame number from a test set for the performance measure, and $y_i$ may be the predicted first ROI coordinate 204. Thus, each sample may contribute to the error function with its squared minimal distance from the interval, so that the algorithm that achieves the minimal error may be chosen.

In another example, evaluation metric may be performed by counting tagged second ROIs 204' for each frame within and/or in some predefined distance from the predicted first ROI coordinate 204, and then some quantitative logics may be applied to be summed for all frames. The predefined distance may be any distance within the predicted first ROI 204, and a predefined acceptable frame size based on the predicted first ROI 204 may indicate the acceptable region such that if a tagged second ROI coordinate 204' is found inside the acceptable region of ROI then the prediction may be a success. The quantitative logics may be, if all tags are inside the acceptable region, the prediction may be a success, and/or the rate between the inside and outside of the acceptable region within the frame, and/or if the predicted first ROI 204 is in between the tags, then, if the closest tag is within the acceptable region, the prediction may be a success where the sum of quantitative logics across all frames may be calculated for the result.

Figure 3:
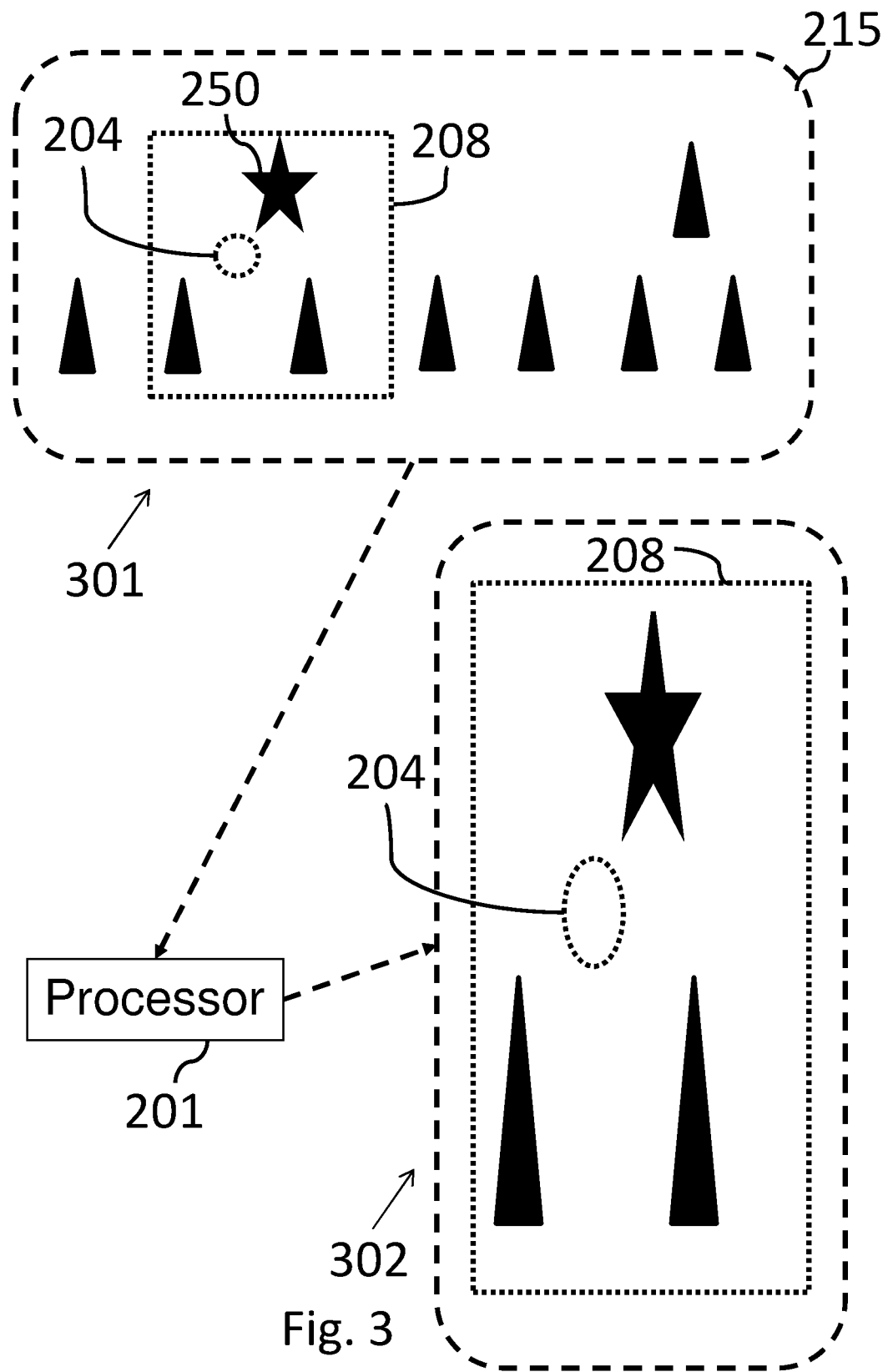
FIG. 3 schematically illustrates cropping media to a new media data element, according to some embodiments of the invention.

Reference is now made to FIG. 3, which schematically illustrates cropping media to a new media data element (e.g., having a different display aspect ratio), according to some embodiments. Processor 201 may receive a source media data element 205 in a first display aspect ratio 301 (e.g., horizontal) and predict at least one first ROI 204. Once the at least one first ROI 204 is predicted, the processor 201 may crop the source media data element 205 to a second display aspect ratio 302 (e.g., vertical).

Figure 4:
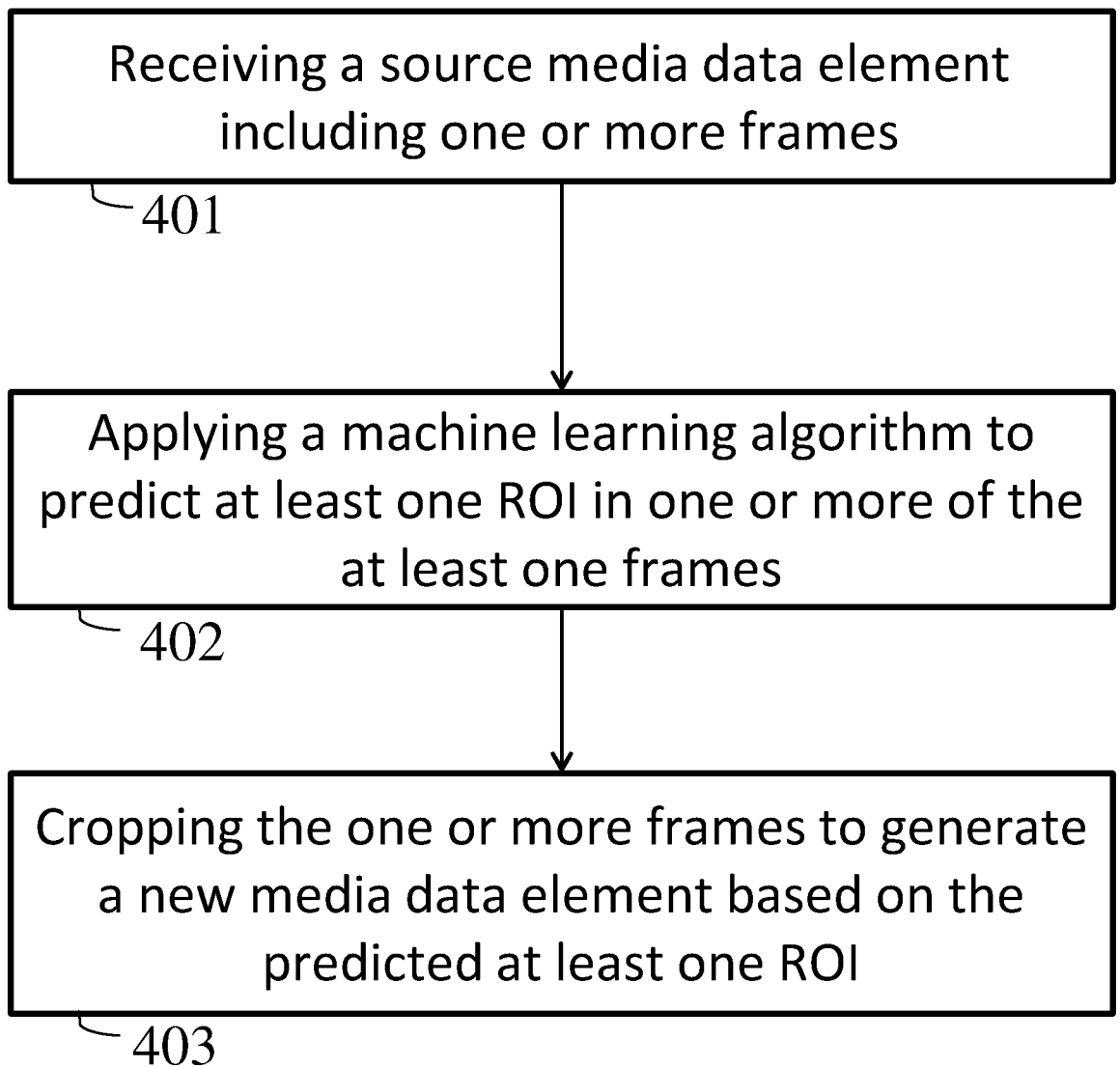
FIG. 4 shows a flowchart for a method of predicting ROI in media and generating a new media data element from a source media data element, according to some embodiments of the invention.

Reference is now made to FIG. 4, which shows a flowchart for a method of predicting ROI in media and generating a new media data element from a source media data element, according to some embodiments.

In Step 401, the processor 201 may receive the source media data element 205 including one or more frames 207 (and/or at least one frame sequences). In Step 402, the processor 201 may apply the machine learning algorithm 203 to predict at least one first ROI 204 in one or more of the at least one frames 207. In Step 403, the processor 201 may crop the one or more frames 207 to generate a new media data element 206 (e.g., a subset) based on the predicted at least one first ROI 204. According to some embodiments, the processor 201 may crop a subsample of the frames used for prediction, but not necessarily crop the same frames that were used for prediction.

Reference is now made back to FIG. 3. According to some embodiments, a first ROI 204 may be predicted without the initial stage of tagging. The processor 201 may receive a new source media data element having a first display aspect ratio 301, and select a second display aspect ratio 302, wherein the second display aspect ratio 302 may be different than the first display aspect ratio 301. The processor 201 may apply a neural network (e.g., with CNN and/or encoder and/or RNN) trained with a supervised or unsupervised machine learning algorithm 203 to determine at least one object 250 in the received media data element 205, for example determine a surfer is surfing on a board with waves in the background. The processor 201 may predict the first ROI 204 in the received media data element 205 to include the determined object 250 in each frame in the second display aspect ratio 302, for instance based on separation of at least object 250 from the background in the received media data element 205.

In some embodiments, the system 200 improves media streaming for mobile computerized devices by predicting the first ROI in media and only displaying the first ROI to the viewer. The system 200 also improves the technological problem of vertically displaying media (e.g., automatically crop video to be displayed vertically) for mobile devices. The system 200 may apply a dedicated machine learning algorithm to predict first ROI in newly received media and accordingly crop a portion of the source media 205 (e.g., to only show the first ROI to viewers) based on the predicted at least one first ROI 204, for instance a media provider using system 200 may stream a live event (e.g., a sport game) where the first ROI is automatically predicted by system 200 and crop a portion of the source media 205 (e.g., where only the first ROI is immediately displayed to the viewer (e.g., vertically)) based on the predicted at least one first ROI 204 since there is no need to wait for tagging by a human once the system is trained.

Figure 5:
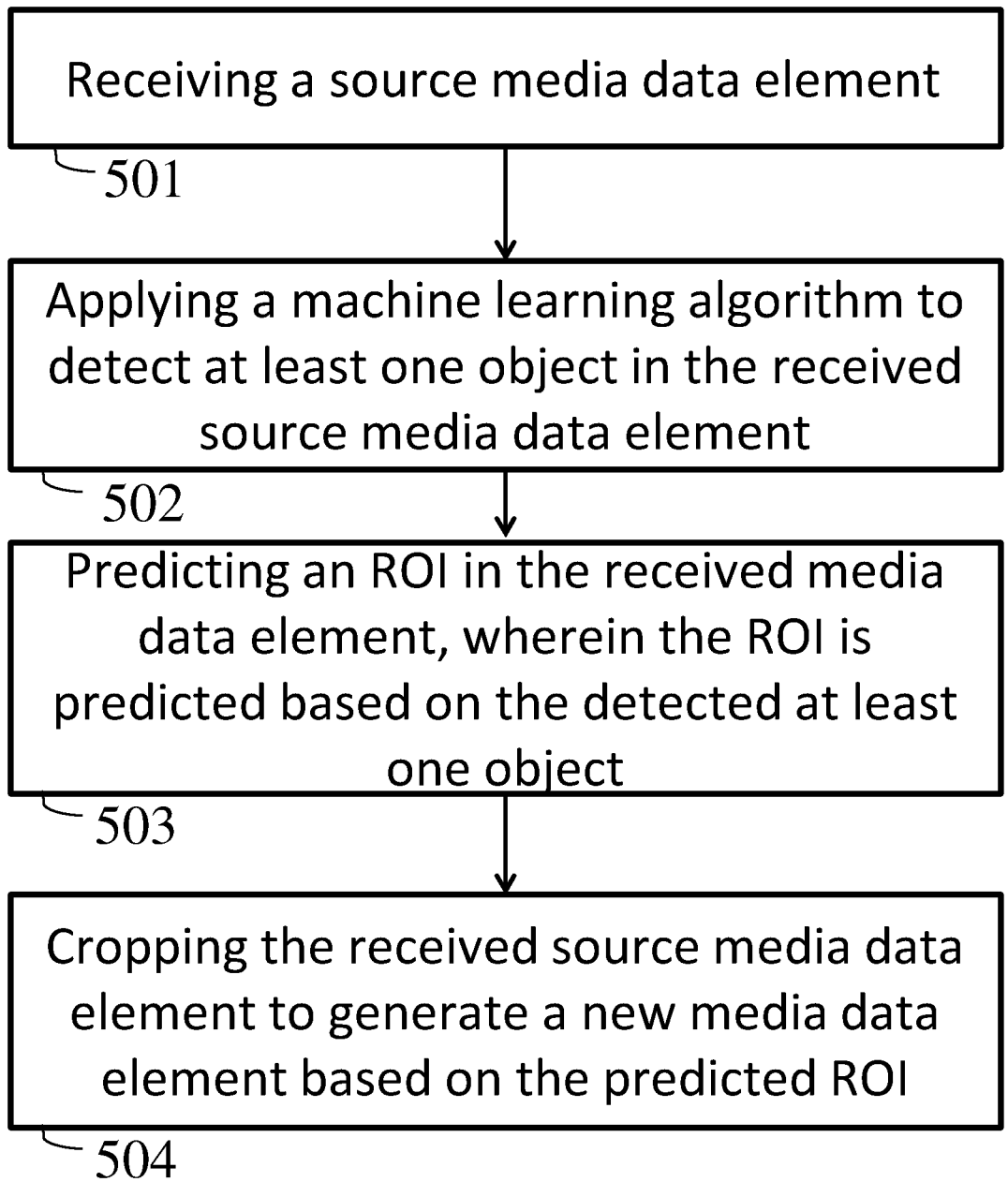
FIG. 5 shows a flowchart for a method of predicting ROI in media data elements, according to some embodiments of the invention.

Reference is now made to FIG. 5, which shows a flowchart for a method of predicting ROI in media data elements, according to some embodiments. In Step 501, the processor 201 may receive a source media data element 205 (e.g., with at least one frame 207).

In Step 502, the processor 201 may apply a machine learning algorithm 203 to detect at least one object 250 in the received source media data element 205. For example, the at least one object 250 may be a ball in a video of a sporting event. In Step 503, the processor 201 may predict a first ROI 204 in the received source media data element 205, where the first ROI may be predicted based on the detected at least one object 250. In Step 504, the processor 201 may crop the received source media data element 205 to generate a new media data element 206 based on the predicted first ROI 204. In some embodiments, the generated new media data element 206 may be a portion (or a subset) of the source media data element 205.

Figure 6:
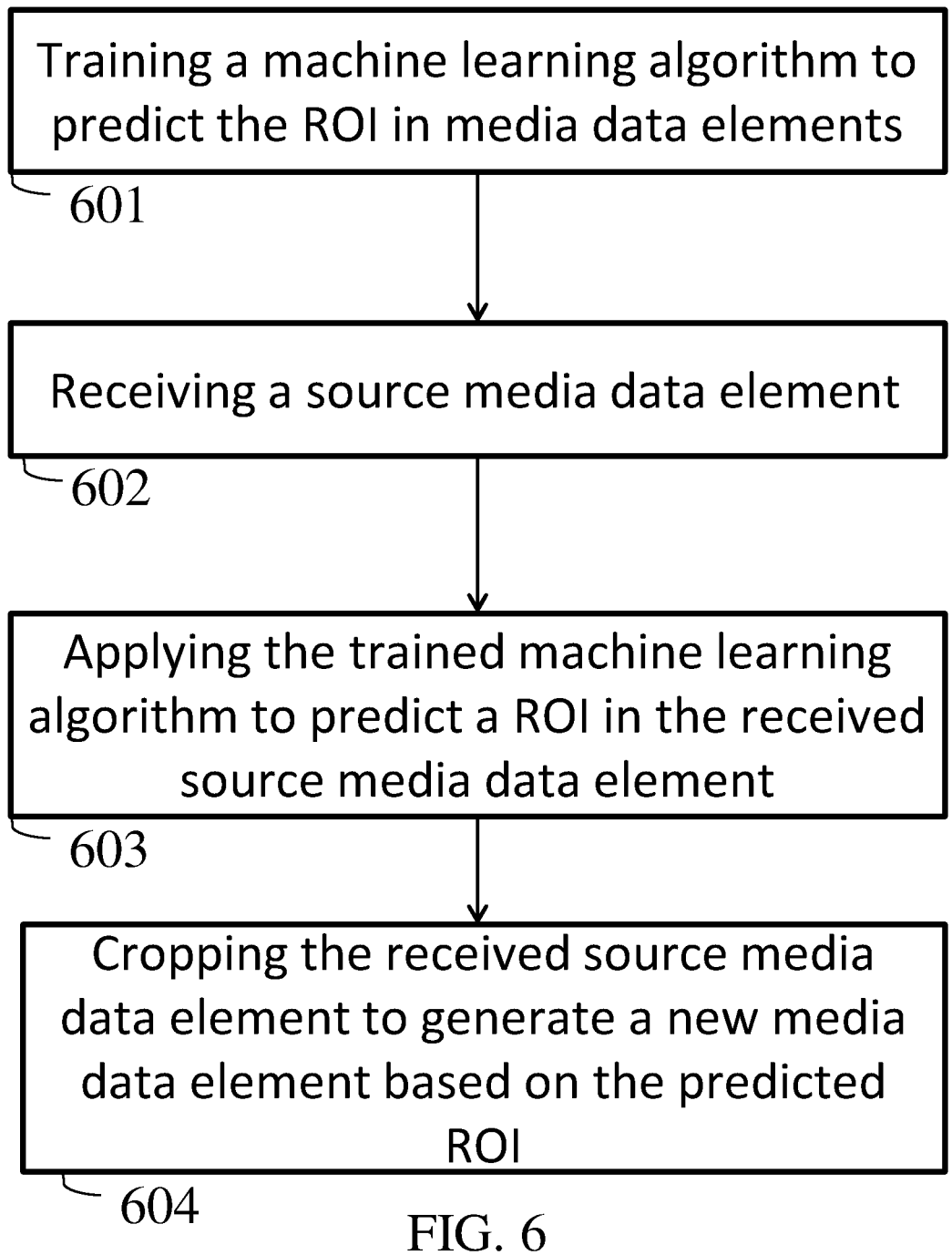
FIG. 6 shows a flowchart for a method of predicting ROI in media, according to some embodiments of the invention.

Reference is now made to FIG. 6, which shows a flowchart for a method of predicting ROI in media, according to some embodiments. In Step 601, the processor 201 may train a machine learning algorithm 203 to predict the first ROI 204 in media data elements 205.

In some embodiments, the training may include the processor 201 receiving a plurality of source media data elements 205 with at least one frame 207, tagging at least one second ROI 204' for each of the received media data elements, and feeding the at least one second ROI 204' to train the machine learning algorithm 203 to predict the first ROI 204 in another frame 207.

In Step 602, the processor 201 may receive a source media data element 205. In Step 603, the processor 201 may apply the trained machine learning algorithm 203 to predict a first ROI 204 in the received source media data element 205. In some embodiments, in Step 604 the processor 201 may crop the received source media data element 205 to generate a new media data element 206 based on the predicted first ROI 204, where the generated new media data element 206 may be a subset of the source media data element 205.

The systems and methods described above may allow fully automated process, with prediction of the first ROI in newly received media as a practical application to provide media in a way desired by users of mobile devices, and without dedicating valuable human resource time (for tagging each newly received media in real time) while providing results not obtainable by the same process carried out by a human. Additionally, such systems and methods may provide a result based on media from a single source (e.g., a camera), such that there is no need for an array of cameras and cameramen to capture different ROIs.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may of course include features from other embodiments presented, and embodiments not specifically described may include various features described herein.

The invention claimed is:

1. A method of generating a new media data element from a source media data element, the method comprising:
receiving, by a processor, the source media data element comprising one or more frames;
applying, by the processor, a machine learning algorithm to predict at least one first Region of Interest (ROI) in one or more of the at least one frames;
cropping, the one or more frames to generate a new media data element based on the predicted at least one first ROI; and
training the machine learning algorithm, wherein the training comprises:
receiving, by the processor, a plurality of media data elements;
tagging at least one second ROI for each media data element of the plurality of media data elements; and
feeding the received media data elements and each of the at least one second ROI to the machine learning algorithm to train the machine learning algorithm to predict the at least one first ROI in one or more of the at least one frames in the source media data element or to predict at least another ROI in another media data element,
wherein the machine learning algorithm is trained to minimize a regression loss function on the plurality of media data elements by at least one of: mean squared error, L1 mean absolute error, log-cosh error and Huber loss error between the predicted coordinates of the ROI and the tagged coordinates of the ROI.

2. The method of claim 1, wherein the machine learning algorithm comprises at least one of: a Convolutional Neural Network (CNN) and a Recurrent Neural Network (RNN).

3. The method of claim 1, wherein the tagging is carried out in at least one of two perpendicular axes.

4. The method of claim 1, further comprising applying an encoder to perform a transformation to at least one frame in the source media data element to produce at least one feature vector, wherein the machine learning algorithm is configured to predict the at least one first ROI based on the produced at least one feature vector.

5. The method of claim 4, wherein training the encoder is unsupervised.

6. The method of claim 4, wherein training the encoder is supervised.

7. The method of claim 1, further comprising modifying the predicted at least one first ROI, wherein at least one frame of the new media data element comprises the modified at least one first ROI.

8. The method of claim 1, further comprising modifying the predicted at least one first ROI, wherein at least one frame of the new media data element is cropped based on the modified at least one first ROI.

9. The method of claim 1, wherein at least one frame of the new media data element comprises the predicted at least one ROI.

10. The method of claim 1, wherein the training is based on at least one of: transfer learning and parameters fine tuning.

11. The method of claim 1, further comprising selecting a new display aspect ratio for the generated new media data element, wherein the selected new display aspect ratio is different than a display aspect ratio of the received source media data element.

12. A method of generating a new media data element from a source media data element, the method comprising:
receiving, by a processor, the source media data element comprising one or more frames;
applying, by the processor, a machine learning algorithm to predict at least one first Region of Interest (ROI) in one or more of the at least one frames;
cropping, the one or more frames to generate a new media data element based on the predicted at least one first ROI; applying an encoder to perform a transformation to at least one frame in the source media data element to produce at least one feature vector,
wherein the machine learning algorithm is configured to predict the at least one first ROI based on the produced at least one feature vector, wherein the machine learning algorithm is a recurrent neural network (RNN), wherein the source media data element comprises at least one sequence of frames, and wherein the applying of the encoder comprises:
selecting, by the processor, 'N' frames from the at least one frame sequence; and
feeding each of the 'N' frames to the encoder to receive a sequence of 'N' feature vectors.

13. The method of claim 12, wherein at least one layer of the RNN comprises one of: 'N' bidirectional long short-term memory (LSTM) units and 'N' unidirectional LSTM units.

14. A method of predicting a region of interest (ROI) in media, the method comprising:
- training, by a processor, a machine learning algorithm to predict at least one first ROI in at least one frame of at least one first media data element, wherein the training comprises:
  - receiving, by the processor, a plurality of second media data elements;
  - tagging at least one second ROI for each of the received plurality of second media data elements; and
  - feeding the at least one second ROI to the machine learning algorithm;
- receiving, by a processor, a source media data element of the at least one first media data element; and
- applying, by the processor, the trained machine learning algorithm to predict the at least one first ROI in the received source media data element,
- wherein the machine learning algorithm is trained to minimize a regression loss function on the plurality of second media data elements by at least one of: mean squared error, L1 mean absolute error, log-cosh error and Huber loss error between the predicted coordinates of the at least one first ROI and the tagged coordinates of at least one of the plurality of second ROIs.

15. The method of claim 14, further comprising cropping, by the processor, the received source media data element to generate a new media data element based on the predicted at least one first ROI, wherein the generated new media data element is a subset of the source media data element.

* * * * *